United States Patent
Fletcher

[15] 3,693,346
[45] Sept. 26, 1972

[54] GAS OPERATED ACTUATOR
[72] Inventor: James C. Fletcher, Administrator of the National Aeronautics and Space Administration, with Respect to the Invention of Alex Ambruso, Anaheim, Calif.
[22] Filed: May 28, 1971
[21] Appl. No.: 147,997

[52] U.S. Cl. ................60/36, 60/1, 137/13, 137/81.5
[51] Int. Cl. ..................................F01k 25/00
[58] Field of Search ..........60/1, 23, 36; 137/13, 81.5

[56] References Cited

UNITED STATES PATENTS

| | | |
|---|---|---|
| 1,678,612 | 7/1928 | Walker ..................60/1 X |
| 2,411,089 | 11/1946 | Fredericks et al. ..........60/1 |
| 3,587,227 | 6/1971 | Weingarten ..............60/23 X |

*Primary Examiner*—Martin P. Schwadron
*Assistant Examiner*—Allen M. Ostrager
*Attorney*—John R. Manning, Monte F. Mott and Paul F. McCaul

[57] ABSTRACT

A gas operated actuator including an expansion chamber having an inlet and an outlet containing a membrane or film of material selectively permeable to the drive gas when the membrane is heated. The inlet membrane communicates with a high pressure source of drive gas and the outlet membrane communicates with a low pressure environment or a fluid environment reactive with the drive gas. The actuator is driven by alternately heating the inlet and outlet membranes to affect a cyclical expansion and contraction of the chamber. The actuator may contain a combined inlet-outlet and the membrane contained therein is alternately exposed to the drive gas and low pressure or reactive environment to effect the cyclical motion of the chamber.

7 Claims, 2 Drawing Figures

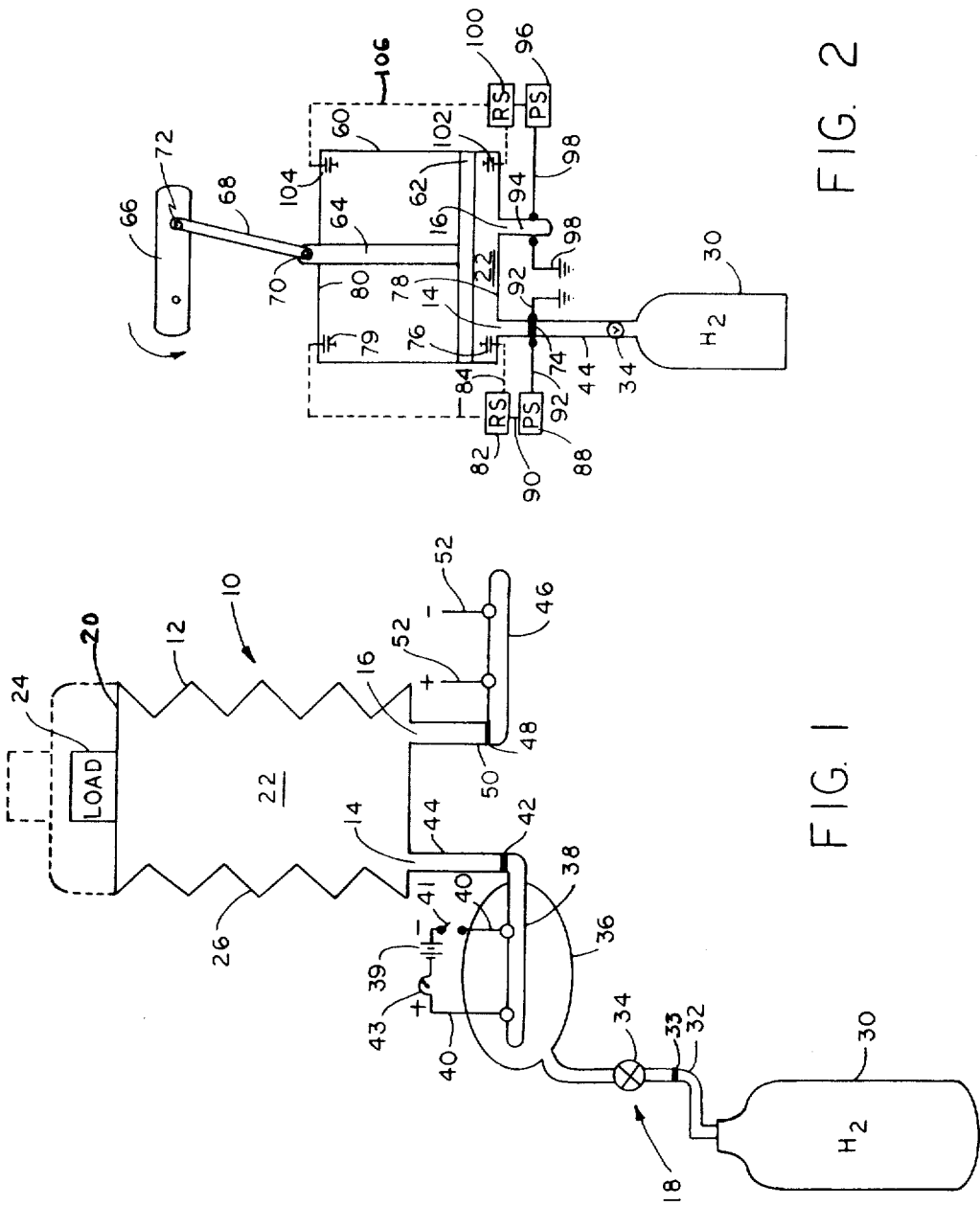

3,693,346

GAS OPERATED ACTUATOR

ORIGIN OF THE INVENTION

The invention described herein was made in the performance of work under a NASA contract and is subject to the provisions of Section 305 of the National Aeronautics and Space Act of 1958, Public Law 85-568 (72 Stat. 435; 42 USC 2457).

BACKGROUND OF THE INVENTION

1. Field of the Invention

The present invention relates to gas operated actuators and more particularly, to an actuator cyclically driven by injection and exhaustion of drive gas through non-mechanical valves.

2. Description of the Prior Art

Pneumatic servos and actuators usually incorporate mechanical valves, linkages and movements to effect the desired control or actuation operations. These devices are complex, require regular maintenance service and may still fail in service due to unreliability or wear-out of components. These devices are complex and their weight is excessive for consideration in aircraft or spacecraft applications.

SUMMARY OF THE INVENTION

The gas operated actuator in accordance with the present invention is simplified, light weight and the drive assembly need not require the use of valves or other moving parts. The actuator is particularly adapted for long term unattended, reliable service such as required in spacecraft missions.

The actuator of this invention includes a gas impermeable, expandable chamber having a gas inlet and a gas outlet, each incorporating a membrane of material selectively permeable to drive gas when heated. A source of high pressure drive gas communicates with the inlet membrane, and the outlet membrane is exposed to a low pressure or pumping environment. Heating means are connected to each of the membranes. The rate of introduction of hydrogen into the expandable chamber, and therefore, the rate of linear drive thereof, can be controlled by controlling the temperature of the inlet membrane.

In another embodiment of the invention, the expandable chamber has a combined inlet and outlet in contact with a first side of a film selectively permeable to the drive gas when heated. The obverse side of the film is alternately placed in communication with a source of high pressure drive gas and a source of pumping medium for the drive gas to cyclically expand and retract the chamber. The pumping medium preferably takes the form of a fluid medium reactive with the drive gas so that as the drive gas leaves the chamber through the film it is chemically combined to form a liquid and removed from pressurizing the system. In the case of hydrogen drive gas, the film comprises palladium and/or alloy thereof and the fluid reactive medium can include an oxidizing gas such as oxygen.

These and many other attendant advantages of the invention will become apparent as the invention becomes better understood by reference to the following detailed description when considered in conjunction with the accompanying drawings.

BRIEF DESCRIPTION OF THE DRAWINGS

FIG. 1 is a schematic illustration of a first embodiment of a gas operated actuator utilizing a gas impermeable extensible bellows to drive a load; and FIG. 2 is a schematic illustration of a second embodiment of the invention to cyclically drive a piston.

DESCRIPTION OF THE PREFERRED EMBODIMENTS

Referring now to FIG. 1, the gas operated actuator 10 includes a gas impermeable, extendable container 12 having a drive gas inlet 14, a drive gas outlet 16 and a drive gas supply source 18 for pressurizing the inlet 14.

The container 12 has at least one movable wall 20 which extends in a linear direction without substantial lateral movement on increase of pressure within the internal chamber 22 of the container 12. A load 24 is applied to the movable wall 20. The container is suitably a sealed bellows formed of stiff convolutions 26 such that the bellows returns to its normal extension on reduction of pressure within the chamber 22.

The drive gas source 18 for the actuator 10 includes a high pressure source of drive gas 30 connected by a length of tubing 32 containing a coupling 33 and a valve 34 to a chamber 36. A closed end tube 38 formed of a material selectively permeable to the drive gas when heated is disposed within the container 36. The tube may be heated directly or indirectly. If the electrical resistance of the closed end tube 38 is sufficient, the tubing may be heated by passage of an electrical current between two spaced points on the tubing. The current is applied to the tubing 38 by conductors 40 from a source of potential 39. The heating circuit may further contain a switch 41 and a variable rheostat 43 to control the temperature of the tube 38. The flow rate through the tube 38, and therefore, the rate of linear drive of the bellows 12, are dependent on the temperature of the tube.

The closed end tube 38 is connected through an elbow coupling 42 to a length of conduit 44 formed of material impermeable to drive gas whether in the heated or unheated state. Conduit 44 is connected to the inlet port 14 of the container 12. The outlet port 16 is similarly connected through an elbow coupling 48 and a connecting conduit 50 to a closed end tube 46 formed of the material selectively permeable to drive gas when heated. The tube 46 is disposed in an environment having a low hydrogen partial pressure such as the vacuum of space or the atmosphere of a planetary body. The environment may be the same environment to which the actuator is exposed. The closed end tube portion 46, is heated by passing a current from a source, not shown, through conductors 52 connected to spaced points along the surface of the tube 46.

The actuator is operated by opening valve 34 to place chamber 36 under pressure. The pressure within chamber 36 is maintained below the collapse pressure of the tube portion 38, suitably 400–500 psi. Valve 34 may then be closed and the source 30 disconnected from the system, through coupling 33. Switch 41 is then closed and rheostat 43 adjusted to apply a current to the closed tube portion 38 sufficient to raise it to a drive gas permeable temperature. The drive gas will traverse the walls of the tube portion 38 and will pass through connector conduit 44 through port 14 into the chamber 22. A small volume, usually a few cc's of drive gas is sufficient to extend the bellows 12 by raising top surface 20 to drive load 24 upwards as indicated by the broken lines in FIG. 1. The drive gas stored within container 36 is sufficient for a substantial number of actuations of the bellows.

When the switch 41 is opened and the current turned off, the tubular portion 38 will cool to below the drive gas permeable temperature and the bellows will remain in the extended position under the pressure of the drive gas contained with the chamber 22. When it is desired to return the load 24 to the initial position or any intermediate point, a current is applied to the tubular portion 46 through conductors 52 to raise the portion 46 to a drive gas permeable temperature. Drive gas will leave the chamber 22 through port 16, connecting conduit 50 and will be exhausted to ambient by traversing the walls of tubular portion 46. The rate of retraction is determined by the current passing through the tube 46. The extent of retraction of the bellows 12 under the force exerted by the load or by the elastic force of the bellows, itself, will depend upon the length of time and the magnitude of current applied to the drive gas permeable tube section 46.

When a long interval elapses between the initial pressurizing of container 36, there may be a very slow diffusion of drive gas through the tube portion 38 into the bellows 12 resulting in a slow extension of the bellows 12, if the permeation rate through inlet tube portion 38 exceeds the permeation rate through outlet tube portion 46. The bellows can be maintained in retracted position by periodically or continuously applying a pulse of current to outlet tube portion 46 to heat it to drive gas permeable temperature to eliminate drive gas from the bellows 12.

When hydrogen is utilized as the drive gas, the tubular portions 38 and 46 may be formed of a thin film of conductive material selectively permeable to hydrogen when heated to a critical temperature, and, substantially impermeable to hydrogen when at a temperature below the critical temperature. Palladium and its alloys are remarkably permeable to hydrogen when heated to a temperature of above about 100° to 500°C, and the rate of diffusion through a palladium containing film at any temperature below the critical temperatures is extremely small. The film of palladium containing material is suitably maintained at temperatures below 600°C and suitably is heated to a temperature from 200° to 300°C during hydrogen permeation through the film.

Pure palladium suffers mechanical distortion when subjected to temperature cycling in the presence of hydrogen. However, an alloy of palladium containing 10 to 30 percent silver, preferably about 25 percent silver, is as permeable to hydrogen and is mechanically stable. Other palladium alloys, for example, palladium-rhodium or palladium-gold alloys may confer more resistance to corrosion and extend the useful life of the film. However, these latter alloys are less permeable to hydrogen.

The palladium tube may be provided in various configurations, and, lengths of tubing may be connected in parallel to provide increased surface area with less flow resistance. Membranes or tubes can also be formed from a base structural material, such as a porous ceramic, coated with a then film of palladium or a suitable hydrogen permeable palladium alloy.

Absolute hydrogen flux is dependent on the tube geometry and temperature. A tube formed of an alloy of 75 percent palladium and 25 percent silver which which is 0.05 inches in diameter, 12 inches long and has wall thickness of 0.05 inches, is permeable to hydrogen when heated to 200°C. This can be achieved by passing about 7 amperes of current through the length of the tube or any convenient manner of heating the walls of the tube may be utilized. The transfer of hydrogen through the tube wall is believed to proceed by formation of palladium hydride on the inner surface of the tube which transfers through the wall to the outer surface where it is decomposed into palladium and hydrogen. The transfer may be enhanced by a pressure driving force such as increasing the hydrogen pressure on one side of the tube or alternatively the obverse surface of the tube or wall may be subjected to negative pumping means to increase the pressure differential to draw hydrogen through the tube.

However, since the reaction is reversible through the wall of the tube, the outlet tubular portion 46 may be disposed in a fluid medium reactive with the feed gas during retraction of the bellows. In the case of hydrogen, and a palladium film the reactive medium is suitably an oxidizing fluid such as oxygen which is flowed past the outside surface of the palladium film which catalyzes the combination of the transferred hydrogen with oxygen to form water. Since the reaction is exothermic, the flow of oxygen must be terminated and the tube cooled to return the tube to a hydrogen impermeable condition.

It has also been found that the amount of oxygen in contact with the palladium surface can also be utilized to control the wall temperature since higher rates of oxygen flow have been found to produce higher tube temperature, and therefore, higher permeability to hydrogen.

The flux of hydrogen through the walls of a tube formed from a palladium alloy containing 25 percent silver 0.025 cm in internal diameter, having 0.125 cm wall thickness and a 25 cm length varies with temperature as the tube is heated in air as shown in the following table:

| Temperature, °C | 200 | 250 | 300 | 350 | 400 | 450 |
|---|---|---|---|---|---|---|
| Flux, ml sec$^{-1}$ | 0.2 | 0.22 | 0.25 | 0.30 | 0.38 | 0.45 |

The actuator of FIG. 1 may be operated in other modes. The inlet tube portion 38 may be eliminated and container 36 pressurized with drive gas. The bellows 12 will expand to extended position. The bellows 12 is retracted by heating outlet tube 46 on command to a drive gas permeable temperature. The container 36 and inlet tube portion 38 may be replaced by the drive gas source and valve 34 to continuously or intermittently pressurize and expand the bellows 12.

Referring now to FIG. 2, a gas operated actuator is illustrated which utilizes a piston chamber having a heated palladium film as an inlet valve member for injection of hydrogen to the expandable chamber and an outlet heated palladium film having its outer surface expand to a low partial pressure hydrogen environment for exhaustion of hydrogen from the piston chamber. The expansible chamber 22 is disposed within a piston cylinder 60 in which a piston 62 is moved by injection and evacuation of hydrogen drive gas to move piston rod 64 in a linear, vertical direction as the chamber 22 expands and contracts. The linear motion of the piston rod 64 may be converted to rotary motion by connecting the rod 64 to crank 66 through a linkage rod 68 pivotally connected to the piston rod at 70 and pivotally connected to the crank at 72.

The inlet port 14 is connected to an inlet tube 44 across which is interposed a palladium film 74. A contact switch 76 is provided on the bottom surface 78 of the cylinder 60 and a switch 79 is applied to the top surface 80 of the piston cylinder 60. The switches 76 and 79 are connected to a relay switch 82 by conductors 84 and relay switch 82 is connected to a potential source 88 through a conductor 90. The potential source 88 is connected to the film 74 by means of conductors 92. Switch 79 when contacted by the upper surface of the piston 62, opens relay switch 82 and switch 76 when contacted by the bottom surface of the piston 62 closes relay switch 76 to apply current to the film 74 to raise it to a hydrogen permeable temperature.

The outlet port 16 is connected to a closed end tubular portion 94 formed of a palladium containing alloy. The tubular portion 94 is connected to a potential source 96 through conductors 98. Potential source 96 is operated by relay switch 100 which is connected to contact switches 102 and 104 through conductors 106. Upper switch 104 when contacted by the piston 62, opens relay switch 100, while switch 102 when contacted by the piston closes the relay switch 100. The tubular portion 94 is disposed in an environment having a low hydrogen partial pressure.

To operate the gas actuator of FIG. 2, valve 34 is opened to apply a hydrogen pressure to film 74. The piston 62 is lowered to contact switch 76 and switch 102 to provide a signal which closes the relay switch 82 and opens the relay switch 100. Tubulation 94 will be maintained in a cold hydrogen impermeable condition while film 74 will be heated to a temperature at which it becomes permeable to hydrogen. Hydrogen will flow through film 74 into chamber 22 and will create a pressure sufficient to raise piston 62 and to rotate crank 66 through the linear motion of the piston rod 64 and the cyclical motion of the linking rod 68.

When piston rod 62 is raised to the top of piston cylinder 60, it will contact switches 79 and 104. Switch 79 will send a signal through conductor 84 to open relay switch 82. The termination of power from source 88 to film 74 results in the film 74 cooling to a hydrogen impermeable temperature. Simultaneously, switch 104 sends a signal to close relay switch 100 which activates power source 96 to heat tubulation 94 to a hydrogen permeable temperature. As the hydrogen leaves chamber 22 through tubulation 94, piston 62 falls to its lower limit to contact switches 76 and 102 and repeat the cycle.

It is to be understood that only preferred embodiments of the invention have been described and that numerous substitutions, alterations and modifications are all permissible without departing from the spirit and scope of the invention as defined in the following claims.

What is claimed is:

1. A gas operated actuator including in combination:
   a drive gas impermeable chamber having a drive gas inlet and a drive gas outlet;
   a source of high pressure drive gas communicating with said inlet for expanding said chamber;
   an environment having a drive gas partial pressure below the pressure of said expanded chamber communicating with said outlet for exhausting and retracting said expanded chamber;
   a thin film, impermeable to said drive gas when cold and selectively permeable to said drive gas when heated interposed in at least one of said inlet and outlet; and
   means for heating said film to a drive gas permeable temperature.

2. An actuator according to claim 1 in which said drive gas is hydrogen, one of said films is interposed in the inlet and one of said films is interposed in said outlet, said films each comprise palladium and said source includes a hydrogen pressurized container in communication with the outside surface of the inlet film.

3. An actuator according to claim 1 wherein said heating means includes a source of electric potential and conductor means connecting said potential source to the inlet film.

4. An actuator according to claim 3 further including switching means for selectively energizing said source.

5. An actuator according to claim 4 wherein said switching means are attached to said chamber and are actuated on movement of said chamber to a limiting position.

6. An actuator according to claim 1 in which said chamber includes a gas expandable bellows.

7. An actuator according to claim 1 further including a body of fluid reactive with the drive gas and means disposing the body of fluid adjacent the outside surface of the outlet film.

* * * * *